(12) United States Patent
Aoshima et al.

(10) Patent No.: US 6,241,524 B1
(45) Date of Patent: Jun. 5, 2001

(54) VIDEO GAME APPARATUS AND IMAGE SYNTHESIZING METHOD THEREOF

(75) Inventors: Nobuyuki Aoshima, Yokohama; Takeyasu Yamamoto, Minato-ku, both of (JP)

(73) Assignee: Namco, Ltd., Tokyo (JP)

( * ) Notice: Subject to any disclaimer, the term of this patent is extended or adjusted under 35 U.S.C. 154(b) by 780 days.

(21) Appl. No.: 08/565,584

(22) Filed: Nov. 30, 1995

(30) Foreign Application Priority Data

Dec. 2, 1994 (JP) .................................................... 6-329694

(51) Int. Cl.$^7$ ................................. A63F 9/24; G09B 19/00
(52) U.S. Cl. .................................. 434/118; 463/6; 463/30; 345/336
(58) Field of Search .................................... 463/1–2, 5–7, 463/9, 30, 31, 32, 33, 34, 35, 36, 38, 49, 53; 434/30, 35, 29, 62, 69, 43, 44, 45, 46, 47, 48, 49, 55, 118, 307 R; 364/410, 411; 273/DIG. 26, DIG. 28

(56) References Cited

U.S. PATENT DOCUMENTS

| | | | |
|---|---|---|---|
| 4,281,994 | * 8/1981 | Dell et al. .............................. 434/30 |
| 4,320,901 | * 3/1982 | Morrison et al. . | |
| 4,622,013 | * 11/1986 | Cerchio ................................ 434/118 |
| 4,752,069 | * 6/1988 | Okada .................................... 463/7 |
| 4,964,077 | * 10/1990 | Eisen et al. ........................... 434/118 |
| 5,018,082 | * 5/1991 | Obata et al. .......................... 434/118 |
| 5,103,498 | * 4/1992 | Lanier et al. . | |
| 5,184,956 | * 2/1993 | Langlais et al. ....................... 434/62 |
| 5,224,861 | * 7/1993 | Glass et al. ............................ 434/30 |
| 5,239,617 | * 8/1993 | Gardner et al. ...................... 434/118 |
| 5,269,687 | * 12/1993 | Mott et al. ............................... 463/6 |
| 5,299,810 | * 4/1994 | Pierce et al. ............................ 463/2 |
| 5,354,202 | * 10/1994 | Moncrief et al. ....................... 434/69 |
| 5,413,355 | * 5/1995 | Gonzalez . | |
| 5,415,549 | * 5/1995 | Logg .................................... 434/33 |
| 5,469,175 | * 11/1995 | Boman ................................ 473/409 |
| 5,507,485 | * 4/1996 | Fisher ................................. 364/410 |

* cited by examiner

*Primary Examiner*—Mark Sager
(74) *Attorney, Agent, or Firm*—Oliff & Berridge, PLC

(57) ABSTRACT

There is provided a game apparatus which can display an advice data appropriate to the sate of game development and player's operation so that the player can master a high-level and complicated game while playing the game.

The game apparatus has a control section through which the player plays the game and a game computing section for computing the game and displaying a game image on a display, based on an operation signal from the control section.

The game computing section computes and outputs advice data depending on the state of game on the display.

20 Claims, 15 Drawing Sheets

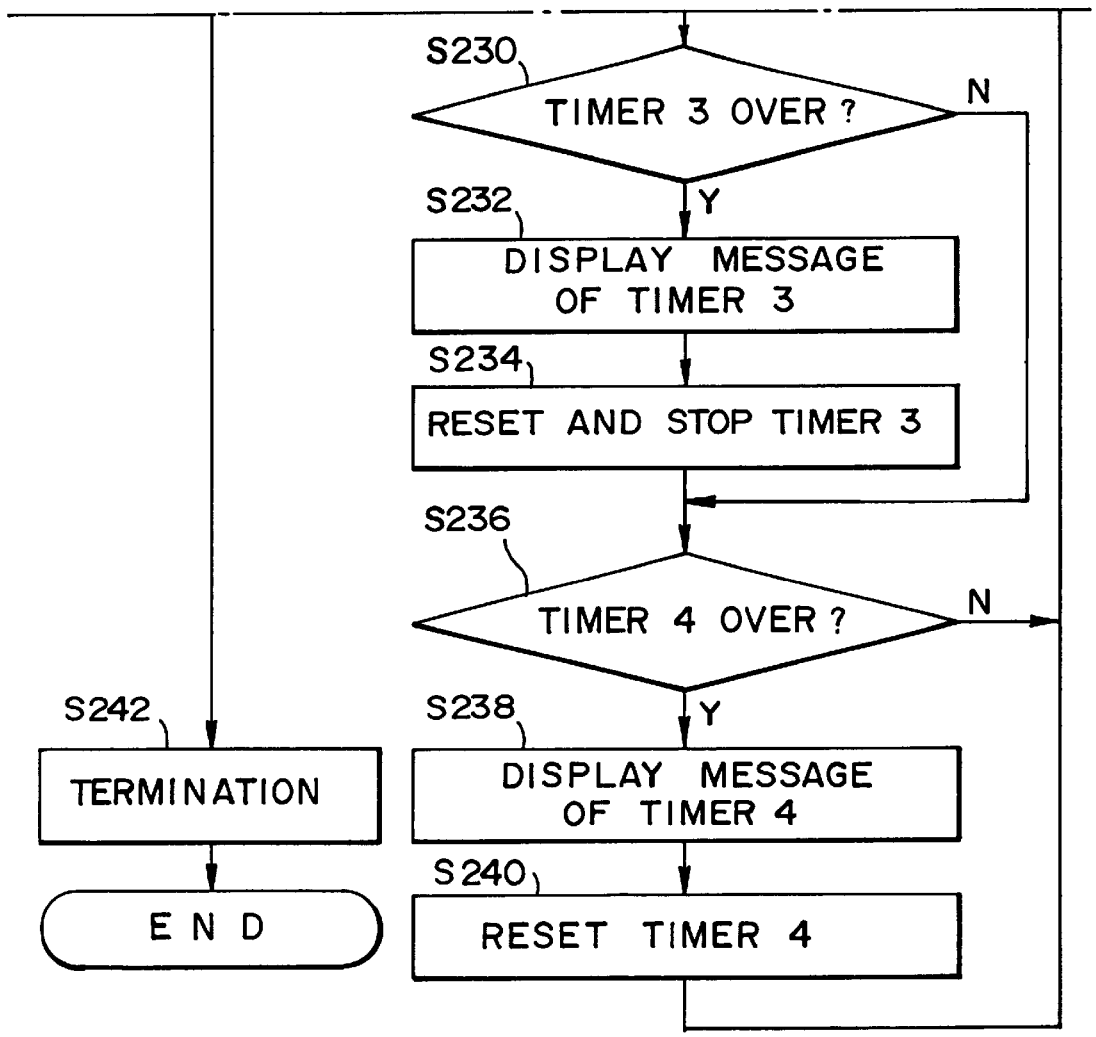
MESSAGE OF TIMER 1 "MOVE TWO STICKS IN THE OPPOSITE DIRECTIONS"
MESSAGE OF TIMER 2 "USE TWO KINDS OF ARMS"
MESSAGE OF TIMER 3 "PUSH CENTRAL BUTTON"
MESSAGE OF TIMER 4 "MOVE TWO STICKS IN THE SAME DIRECTIONS"
FIG. 12 (con't)

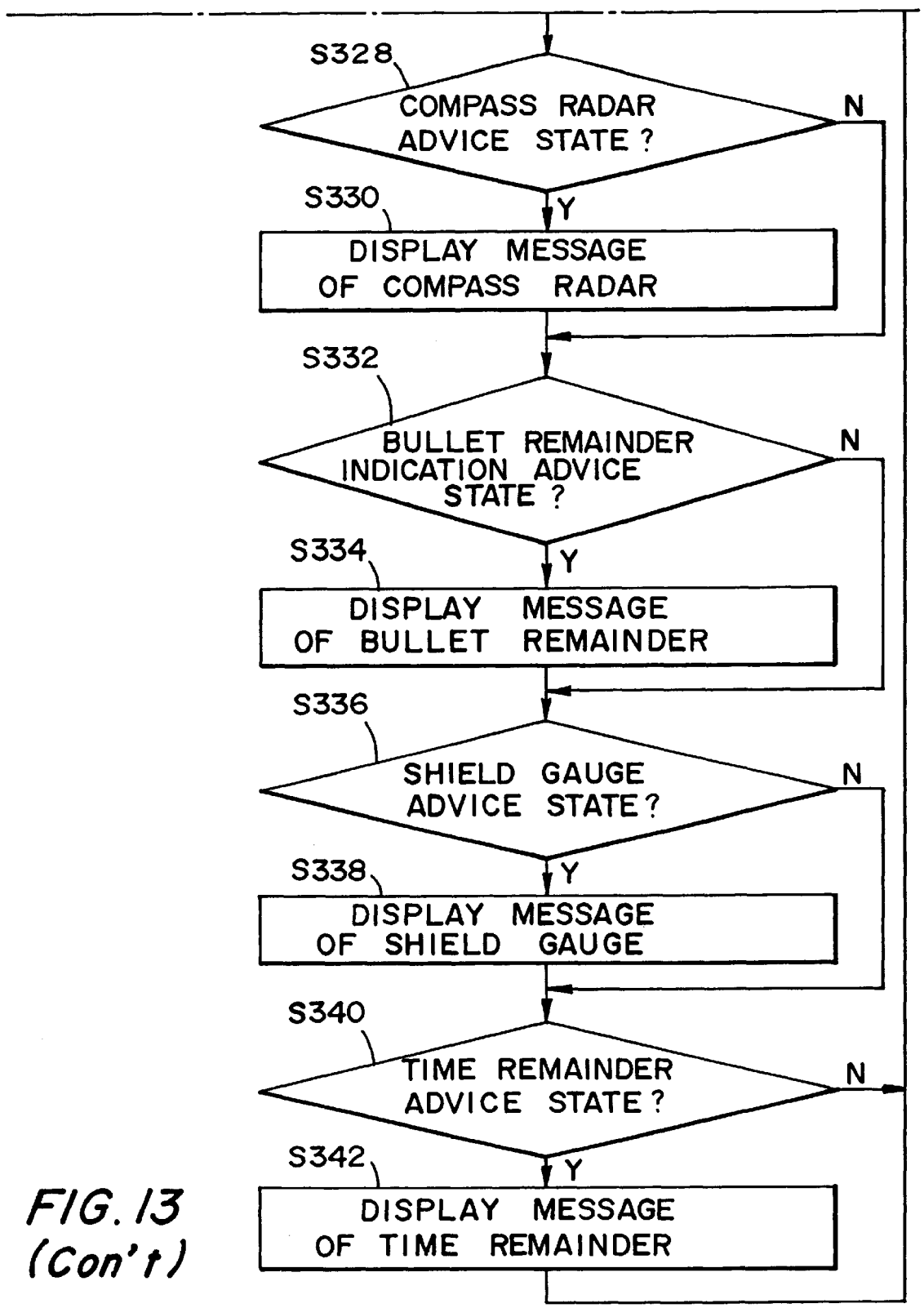
FIG. 13 (Con't)

VIDEO GAME APPARATUS AND IMAGE SYNTHESIZING METHOD THEREOF

BACKGROUND OF THE INVENTION

1. [Field of the Invention]

The present invention relates to a video game apparatus for playing a game while seeing a game image on a display and an image synthesizing method thereof.

2. [Description of the Related Art]

Video games have now be broadly played. In recent years, the contents and operating means of many video games have been more complicated. Players lost interest in playing simple games will desire any more complicated and high-level game. Thus, the contents and operating means of the video games tend to be increasingly complicated.

To play such a complicated game, the prior art has provided a game machine in which a player must read an explanatory note on an operation panel to understand the contents and operation process of a game before it is started.

However, an arcade game machine is played by many and unspecified players. It is impossible that all the players read the explanatory note prior to start of the game. Even if an interesting game is developed on purpose, the players may keep a distance from the game because the contents or operational process of the game are more complicated. This raised a problem in that the operation rate of the arcade game machine will not increase.

If the contents and operations of the game are particularly complicated, the players cannot often understand the contents of the game by the explanatory note only on the game apparatus. In such a case, a player may lose the will to play. Even though a player plays the game, the player would not enjoy the game sufficiently to lose the player's will to play again.

SUMMARY OF THE INVENTION

In view of the above problems, an object of the present invention is to provide a video game apparatus in which a player can sufficiently enjoy a high-level game having its complicated contents and operational process since they can be understood by the player during playing of the game and also to provide an image synthesizing method usable in such a video game apparatus.

To this end, the present invention provides a video game apparatus comprising:

a display;

game operating means operated by a player; and game computing means for computing a game in accordance with an operation signal from the game operating means and a predetermined game program to display a game image on the display; and wherein the game computing means comprises advice data computing means which computes and outputs advice data for the player depending on a state of the game.

In the present invention, thus, the advice computing means is adapted to compute and output the advice depending on the state of game. Even if the player has not mastered the contents and operational process before the game had been started, the player can go on with the game according to the outputted advice. In other words, the player can master the contents and operational process of the game while playing the game. In the present invention, it is also preferred that the advice data computing means computes advice data depending on a state of the game to display an advice image.

According to such an arrangement, the player can see the advice outputted onto the image while playing the game since the advice is displayed on the image. Any unfamiliar player can go on with the game while seeing the advice on the image, without interfering the proceeding of the game, since the advice is outputted on the display depending on the state of game.

It is preferred that the game apparatus of the present invention further comprises sound generating means for producing sounds for the game, wherein the advice data computing means computes advice data depending on a state of the game to generate advice sounds through the sound generating means.

Since the advice is outputted as voices, thus, the player can hear the advice while playing the game. Since the advice is outputted depending on the sate of game, any unfamiliar player can go on with the game while hearing the advice.

In the present invention, it is further preferred that the game computing means computes dynamic images for advice display and displays the dynamic images on the display.

Since the contents of the advice is visually displayed as a dynamic image, thus, the player can easily receive the contents that cannot easily be understood by the player if the contents are only formed by words. Particularly with an advice used to inform the operational process of the operating means, it is effective to display it by the dynamic image since the player can momentarily understand the operational process.

It is further preferred that the game computing means displays the advice data computed by the advice data computing means in a window in a game image.

Thus, the advice is displayed in the window superimposed on the game image. Therefore, the advice can legibly be outputted without interrupting the game image with the advice. As a result, the player can smoothly go on with the game while seeing the advice displayed in the window on the game image.

In the present invention, it is further preferred that the advice data computing means comprises a game state judging section for judging a state of the game to select advice data appropriate to the state of the game.

Even if a game having a complicated development of game is played, the player can master the game while going on with the game since an advice is outputted relating to what manner the player must take against the state of game.

In the present invention, it is further preferred that the advice data computing means comprises an operational state judging section for judging an operational state from an operational history of the player to select advice data appropriate to the operational history of the player.

Thus, the player can master the operational process of the operating means while going on with the game since the operational process is advised to any unfamiliar player when he or she cannot successfully play the game.

In the present invention, it is further preferred that the advice data computing means comprises a gauge data judging section for judging data of gauges used in the game to select advice data appropriate to gauge data.

Thus, the player can go on with the game even if the player does not master the reading of the gauge since an advice relating to the gauge is outputted if necessary even when the gauge is too high in level and too complicated for the player.

In the present invention, it is further preferred that the game operating means comprises advice deciding means for the player to decide whether advice display is required or not.

Thus, there can be provided a game apparatus which can be enjoyed by many players including beginners and high-lank players since a skilled player can enjoy the game without any advice.

In the present invention, the game computing means proceeds with the game without interruption when an advice image is being displayed.

Thus, the player can receive the advice without interruption of the game and therefore enjoy the speedy game development having an increased presence.

In the present invention, the game operating means comprises advice terminating means; and wherein the game computing means may be adapted to stop the game when an advice image is being displayed, and restarts the game when the advice terminating means is operated during advice display.

Thus, there can promptly be terminated an advice image that is judged not to be required by the player (e.g., an advice image for a beginner).

In the present invention, the advice data computing means may be adapted to limit displaying of identical advice images to a given number of times.

Thus, an unfamiliar beginner can effectively master the contents and operational process of a game since an advice output is performed immediately after the game has been started. By restricting the number of the advice outputs, further, the player can enjoy the game decreasing the number of unnecessary advice outputs which may cause errors in judgment and operation.

In the present invention, it is further preferred that the game operating means comprises:

steering means for steering a player's object which moves in a game space; and attacking means to be actuated by the player for attacking an enemy or target;

wherein the game computing means comprises:

three-dimensional space computing means for computing a three-dimensional game space in which the player's object moves and attacks the enemy or target, in accordance with an operational signal from the game computing means and a predetermined game program; and three-dimensional image synthesizing means for synthesizing a pseudo three-dimensional image which is obtained when the three-dimensional game space is viewed from a given viewpoint to display the pseudo three-dimensional image on the display as a game image; and wherein the advice data computing means comprises:

data storage means which stores various operating data of the steering means and the attacking means in different states of the game as advice data; and state judging means for judging a state of the game to read out and output the advice data appropriate to the state of the game from the data storage means.

Thus, the pseudo three-dimensional space can be displayed wherein the player can enjoy a game attacking enemies or targets while operating the mover. Furthermore, the player can master the operational process and attacking/defending method while playing the game, even though that game requires a complicated operation including an operational combination of the player's right and left hands and further a complicated manipulation for attacking the enemies or targets.

The present invention further provides an image synthesizing method usable in such a video game apparatus as described hereinbefore, comprising the steps of:

computing a game in accordance with an operation signal from a player's operating means and a predetermined game program; and synthesizing a game image in accordance with game computation to display the game image on a display; and wherein the step of computing the game comprises a step of reading out advice data appropriate to a state of the game form data storage means which stores various operating data of steering means and attacking means in different states of the game to display read advice data of the display.

According such a method, a video game apparatus can be attained in which an advice for the player is displayed on the display as an image depending on the state of game. Thus, any unfamiliar player can play the game while seeing the advice displayed on the display.

As described, any player not mastered the game can master the game while playing the game since the advice is outputted depending on the states of game development and player's operation. Any high-lank player can perfectly enjoy a high-level and complicated game by using the displayed advice.

DESCRIPTION OF THE PREFERRED EMBODIMENTS

Some preferred embodiments of the present invention will now be described with reference to the drawings.

Figure 2:
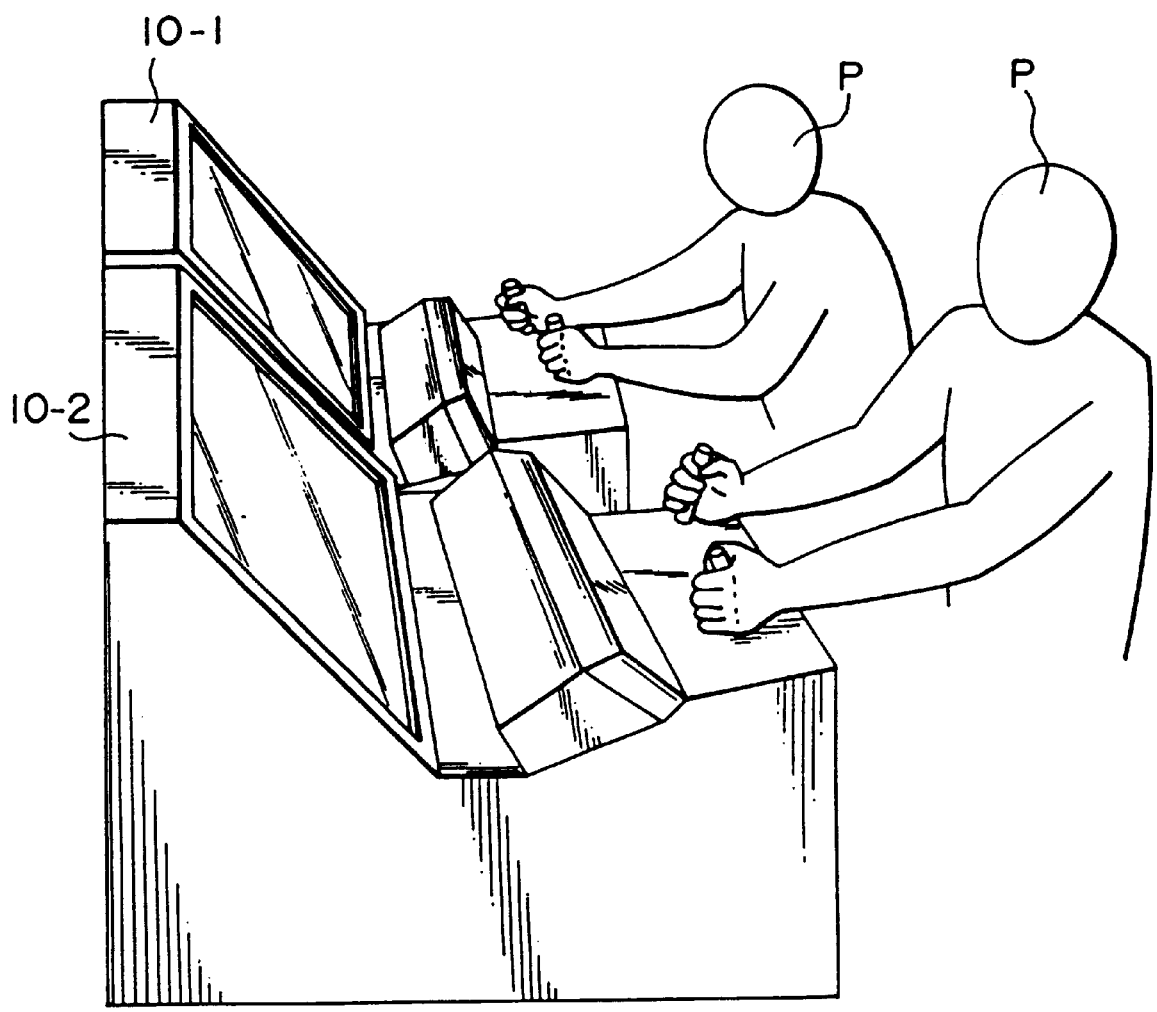
FIG. 2 is a view illustrating the appearance of a game system in which a multi-player game is played between a plurality of game machines while making the transmission/reception of data therebetween.

FIG. 2 shows a game system according to this embodiment. The game system comprises a plurality of independent game apparatuses 10-1 and 10-2 which are connected to each other through data transmission lines.

Each of the game apparatuses 10-1 or 10-2 is used to play a three-dimensional game in which a player P moves a futuristic tank freely within a virtual three-dimensional game space while fighting another futuristic tank controlled by the other player P and still another futuristic tank controlled by a computer.

Each of the "independent" game apparatuses 10-1 and 10-2 can play a single-player game independently of the other game machine. It is of course that these independent game apparatuses can play also a multi-player game within the same game space through the data transmission lines. As will be described, however, the game apparatus of this embodiment is characterized by that it outputs advice data when a player selects a single-player game. Therefore, the game apparatus will be described in connection with a single-player game.

Figure 1:
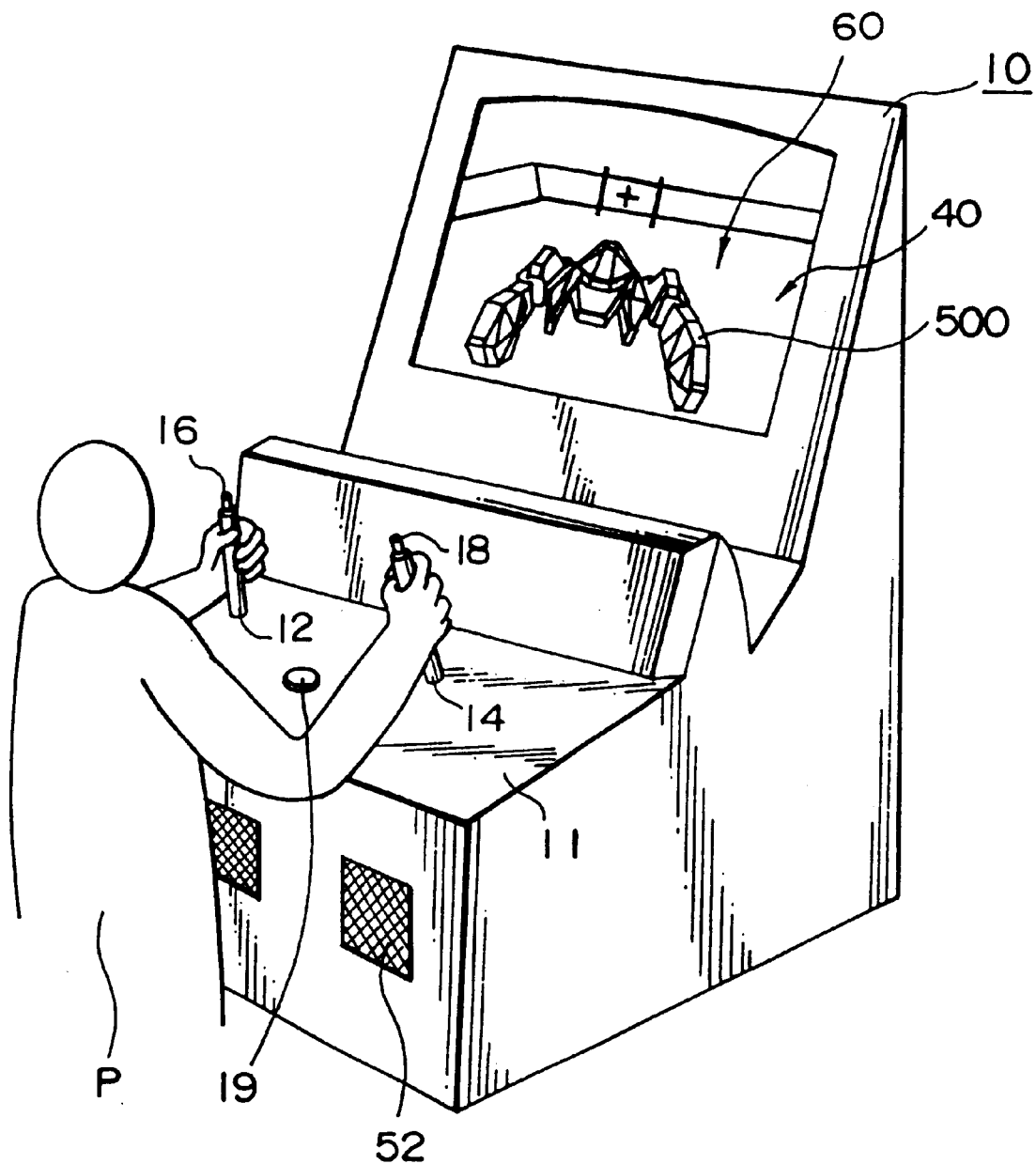
FIG. 1 is a perspective view illustrating the appearance of a three-dimensional game apparatus to which the present invention is applied.

FIG. 1 shows a perspective view of the appearance of the game apparatus 10.

The game apparatus 10 plays a three-dimensional game in which a player P controls a futuristic tank to fight another futuristic tank controlled by a computer within a virtual three-dimensional game space for a single-player game.

The three-dimensional game realized by the game apparatus 10 of the embodiment is a futuristic tank fighting game in a futuristic city by a variety of human races. In this futuristic tank game, fighters gathered to aim a huge prize money play a survival game within a rectangular-shaped field from which they will not be permitted to escape by surrounding walls and one of them will win the championship. Each of the fighters fights the other fighters through his own futuristic tank. Each player plays the futuristic tank game as one of the fighters.

The player P actuates two right- and left-hand analog levers 12, 14 in a control section 11 to control a futuristic tank 500 that is displayed on a display 40. In other words, the player P can control the futuristic tank 500 to move it freely in all the directions within a game field 60 which is set in the virtual three-dimensional game space. Each of the analog levers 12 and 14 is provided with a machine gun indefinitely firing bullets and a trigger 16 or 18 for launching a limited number of powerful missiles. The player uses a sighting mark displayed on the display 40 substantially at the center thereof to aim his or her machine guns and/or missile launchers at an enemy's futuristic tank and then actuates the triggers 16 and 18 to attack the enemy's futuristic tank. A viewpoint changing button 19 is located on the control section 11 substantially at the center thereof. The player can depress this button to change his or her viewpoint.

Figure 3:
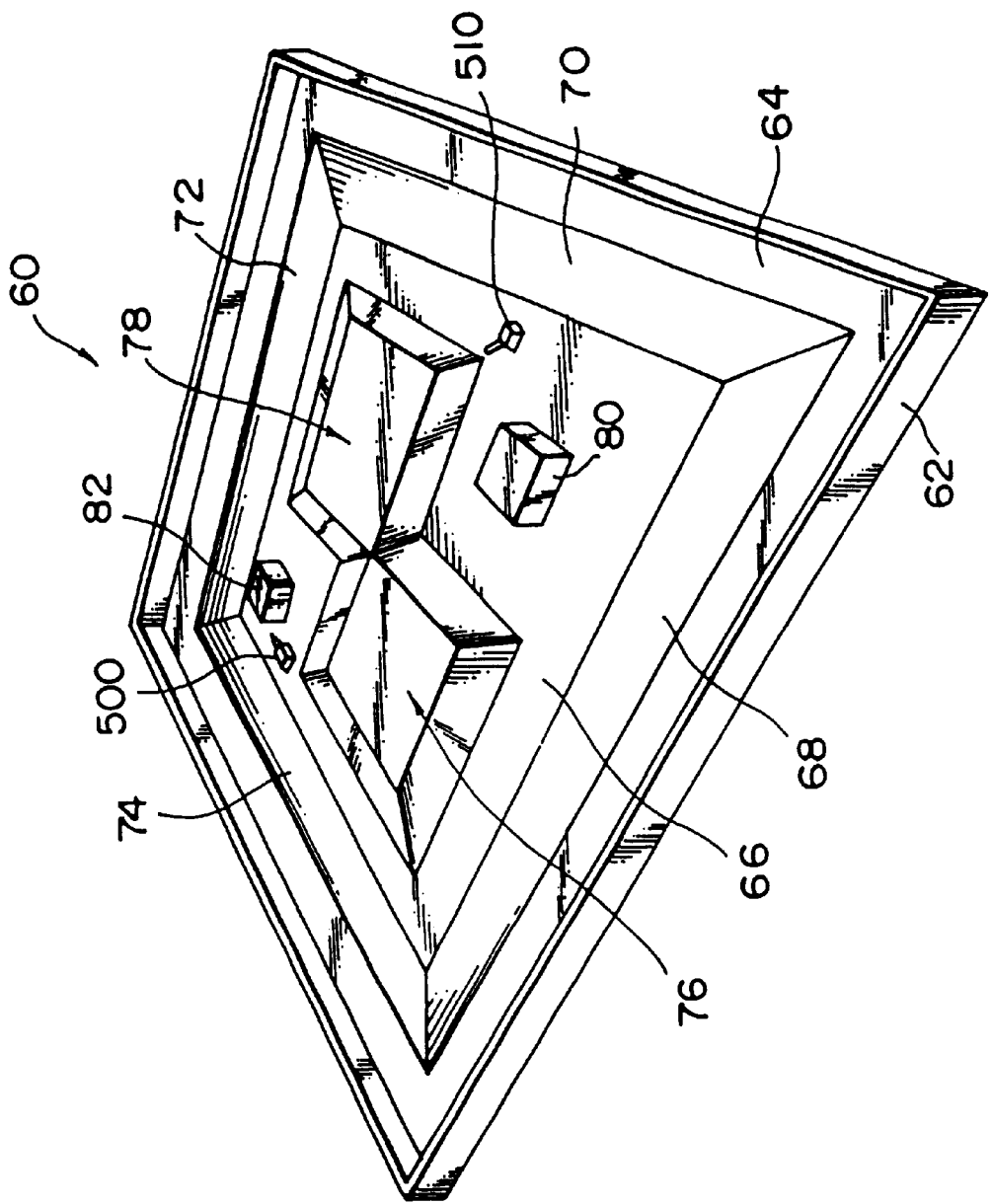
FIG. 3 is a view illustrating a game field that is used in the game apparatus according to this embodiment.

FIG. 3 shows the entire view of the game field 60.

The game field 60 includes a three-dimensional topography which has been set by a game program. The entire game field 60 is surrounded by a wall 62 so that the fighters cannot escape from the game field 60. A first platform 64 extends along the inside of the wall 62. A zero-meter zone 66 is surrounded by the first platform 64 to form slopes 68, 70, 72 and 74 therebetween. The zero-meter zone 66 includes second and third platforms 76, 78 and obstacles 80 and 82.

In the game field 60, the futuristic tank 500 controlled by the player P is now positioned on the zero-meter zone 66 at a position opposite to an enemy futuristic tank 510 which is controlled by an enemy fighter (computer).

The player P actuates the levers 12 and 14 to move his or her futuristic tank 500 to a position wherein it can easily attack the enemy futuristic tank 510 freely within the game field 60. In such a position, the player P attacks the enemy futuristic tank 510.

Figure 4:
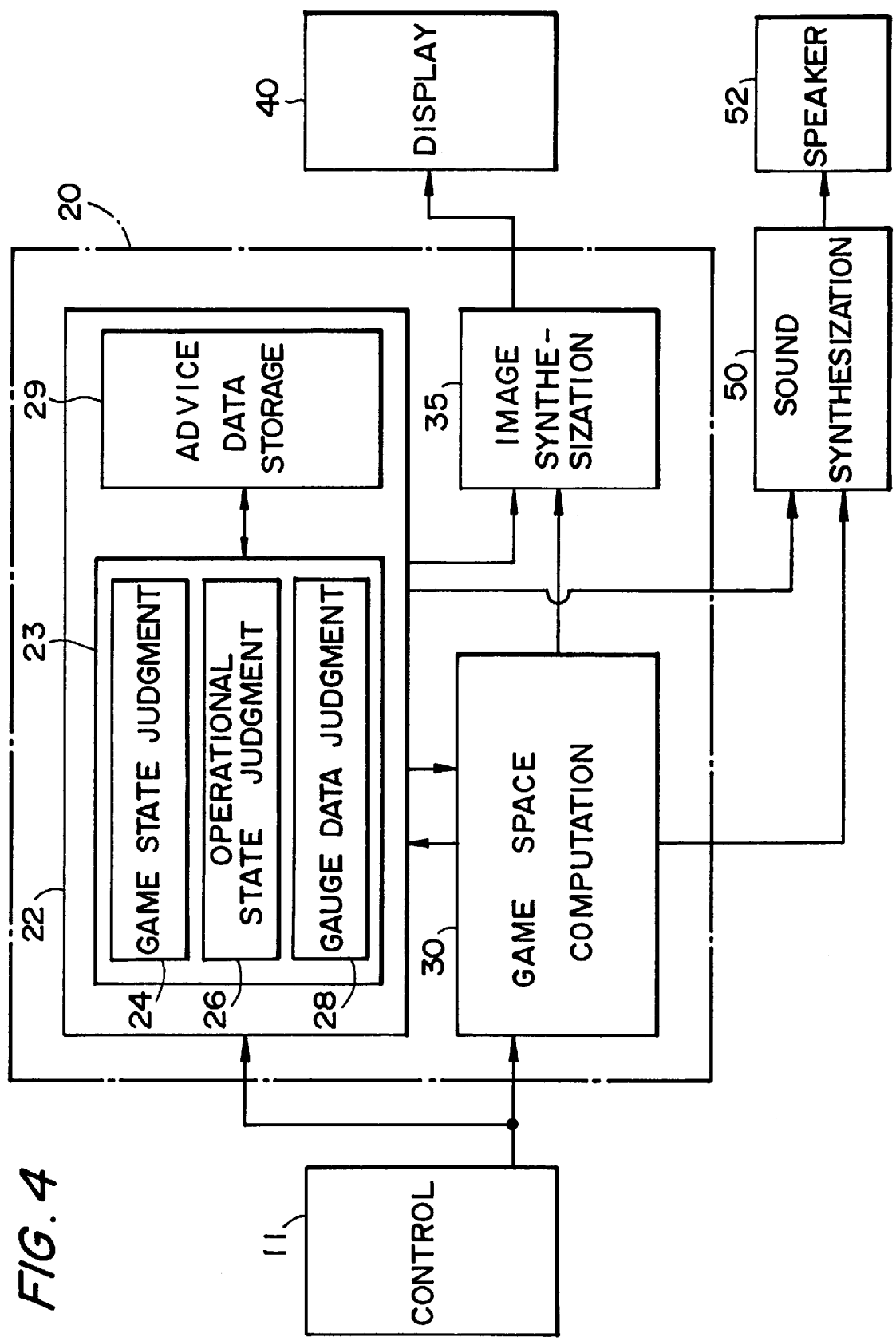
FIG. 4 is a block diagram illustrating a circuit in the game apparatus of the embodiment.

FIG. 4 shows a block diagram of the game apparatus 10 according to the embodiment, which is used to play such a three-dimensional game. The other arrangement of the game apparatus 10 for performing the transmission/reception of data between the game apparatus 10 and the other game apparatus will not be described.

The game apparatus 10 of the embodiment comprises the control section 11, a game computing section 20, the display 40, a voice synthesizing section 50 and a speaker 52.

The control section 11 includes the members actuated by the player, such as the analog levers 12 and 14, triggers 16 and 18, and viewpoint changing button 19 which are shown in FIG. 1. The control section 11 functions as an advice deciding means through which the player instructs the game apparatus to display an advice message for the player, and also as an advice terminating means for terminating advice display, as will be described. When a coin is thrown in, a message "please actuate the trigger 18 if you need advice" is displayed on the display for a given time. The trigger 18 functions as the advice deciding means. When the trigger 18 is actuated by the player during indication of the message, the game apparatus is set at an advice display mode. If the trigger 18 is not actuated by the player, the game apparatus will be set at an advice non-display mode. When the game apparatus is set at the advice display mode and an advice message is displayed in a window on the display 40, the trigger 18 functions as the advice terminating means. When the trigger 18 is actuated by the player during indication of the advice message, the advice displaying window is deleted and the game will then be restarted.

The game computing section 20 comprises a game space computing section 30, an image synthesizing section 35 and an advice data computing section 22.

The game space computing section 30 includes a CPU and a memory. The game space computing section 30 executes various game computations, based on an input signal from the control section 11 and a predetermined game program. The image synthesizing section 35 is then used to display pseudo three-dimensional game images of the aforementioned futuristic tank game on the display 40.

More particularly, the game space computing section 30 executes computations for a game in which the futuristic tanks 500 and 510 controlled by the player P and the computer move within the game field 60 set in a given three-dimensional game space as shown in FIG. 3.

The image synthesizing section 35 perspectively transforms data for the three-dimensional game space into data for a view screen in a given view coordinate system to form and display a pseudo three-dimensional game image on the display 40.

The sound synthesizing section 50 and speaker 52 function as sound output means. The game space computing section 30 computes sound data depending on the proceeding of the game to produce game sound through the speaker 52.

The advice data computing section 22 produces advice messages depending on the state of game, as will be described later.

Figure 5:
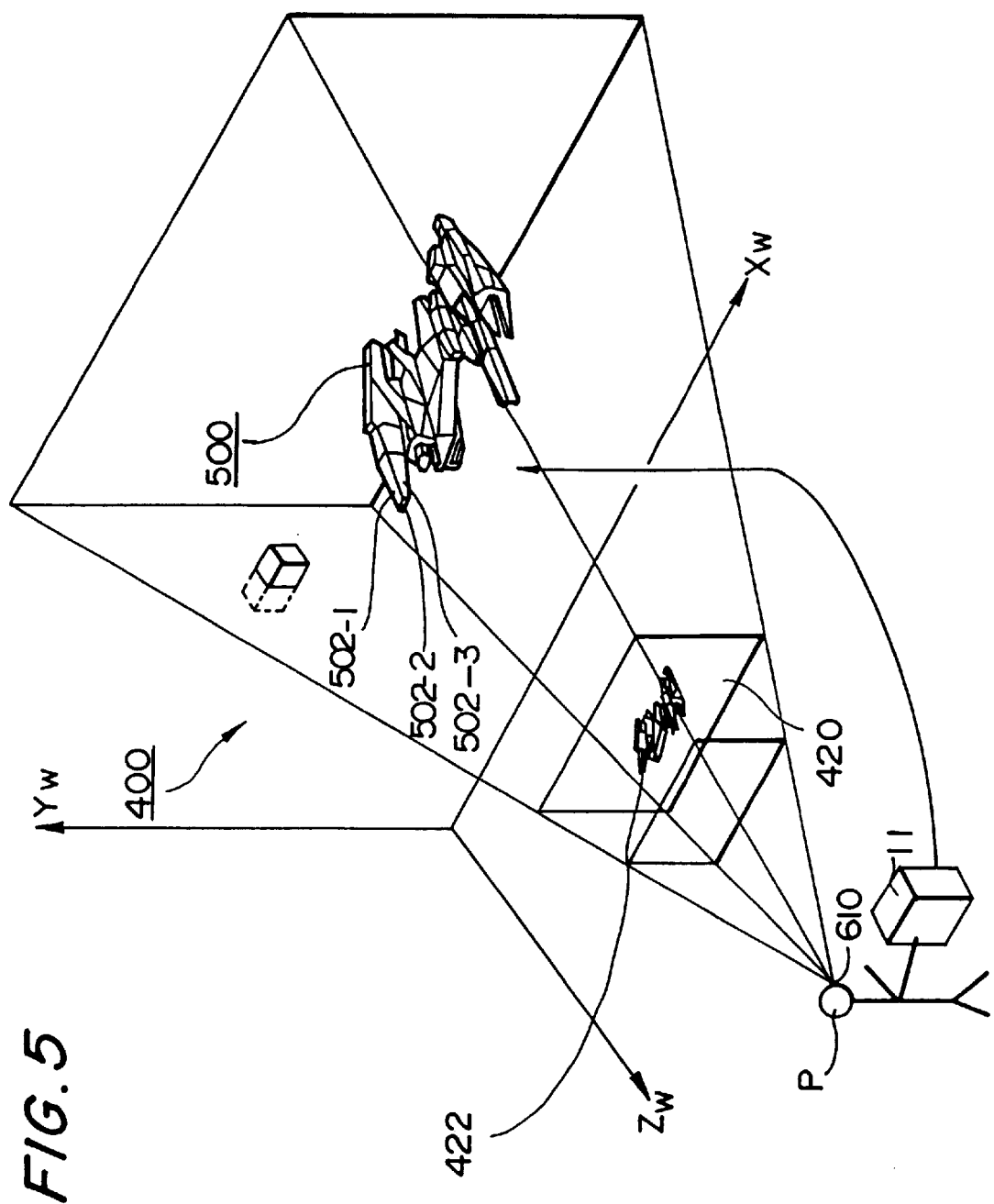
FIG. 5 is a view illustrating the principle of synthesizing a pseudo three-dimensional image in the embodiment.

FIG. 5 shows the process of synthesizing the pseudo three-dimensional game image.

The game apparatus of the embodiment has previously stored data relating to a three-dimensional game space 400 and a three-dimensional object 500 in the three-dimensional game space 400. The data relating to the three-dimensional object 500 has previously been stored in a memory as a geometric model consisting of polygons 502-1, 502-2, 502-3.

With the futuristic tank game of the embodiment, for example, the three-dimensional object 500 may be one of the futuristic tanks 500 and 510 in the three-dimensional game space 400. In the three-dimensional game space 400, various other three-dimensional objects (which may represent the game field 60 shown in FIG. 3, for example) are disposed.

These three-dimensional objects are perspectively transformed into a pseudo three-dimensional image 422 on a view screen 420 in a view coordinate system in which a viewpoint 610 of a player P is centered. Thus, the pseudo three-dimensional image 422 will be displayed on the display 40. In the embodiment, the viewpoint 610 is set to be oriented from behind the futuristic tank 500 controlled by the player to the forward direction. As shown in FIG. 1, therefore, the 5 three-dimensional game space 400 as viewed from behind the player's futuristic tank 500, that is, an image including the player's futuristic tank 500 will be displayed as a pseudo three-dimensional image on the display 40.

When the player P actuates the levers 12 and 14 on the control section 11 to perform the rotation, translating and other transformations of the futuristic tank 500 on which the player P virtually gets, the position of the viewpoint 610 relative to the three-dimensional game space 400 will be changed, resulting in rotation and translating of the three-dimensional game space 400. Based on the operation signal and the game program, thus, the game space computing section 30 executes, in real time, the computations of rotation, translating and so on for the three-dimensional object 500 being the futuristic tank and the other three-dimensional objects all which form the three-dimensional game space 400.

Based on the computed data from the game space computing section 30, the image synthesizing section 35 perspectively transforms data of the image in the three-dimensional game space 400 on which the three-dimensional objects are disposed as described, into data for the view screen 420 to form and display the pseudo three-dimensional image 422 on the display 40 while being varied in real time.

When the player P operates the control section 11 to control the futuristic tank 500, therefore, the player can make a virtual simulation in which he or she joins in the game while driving the futuristic tank 5000 in the play field 60 set within the three-dimensional game space 400.

When a computer graphic technique is used, an independent body coordinate system is used to make a geometric model of the three-dimensional objects 500. More particularly, the geometric model is specified by the polygons 502-1, 502-2 and so on which form the three-dimensional object 500 in this body coordinate system.

The three-dimensional game space 400 is formed using a world coordinate system ($X_w$, $Y_w$, $Z_w$). The three-dimensional object 500 represented by the body coordinate system is disposed in the world coordinate system in accordance with its geometric model.

Coordinates in the three-dimensional game space 400 are perspectively transformed into screen coordinates or a view screen 420 in a view coordinate system in which the position of the viewpoint 610 is taken as an origin and the direction of the viewpoint is coincide with the positive direction on Z-axis. Thus, images viewed from the viewpoint 610 in the visual field within the three-dimensional game space 400 can be displayed on the display 40.

The player P can enjoy the three-dimensional game attacking the enemy futuristic tank 510 while seeing such a game image displayed on the display 40.

The attack/defense in the game of the present embodiment become more effective by using various types of techniques which make good use of the topographies in the game field. However, these techniques are not sufficiently understood particularly by an unfamiliar player even when the explanatory note is read by him or her.

In the present embodiment, the player can actuate the levers 12 and 14 to move his or her futuristic tank freely and also control the triggers 16 and 18 to attack the enemy and further change the viewpoint by depressing the viewpoint changing button 19 on the center of the control section. However, such complicated operations as in the present embodiment cannot sufficiently be used by an unfamiliar player even when the explanatory note is read by him or her.

In the present invention, furthermore, the player must handle various gauges such as main radar, sub-radar, shield gauge, compass and others. The player must also go on with the game while considering the container, the number of remaining bullets and the remaining time. However, these operations cannot sufficiently be executed by an unfamiliar player even when the explanatory note is read by the player.

To overcome such problems, the present invention is characterized by that an advice message is displayed depending on the stat of game such that the player can master the game while playing it.

For such a purpose, the game apparatus of the embodiment comprises the aforementioned advice data computing section 22 which is used to compute advice data to be produced depending on the state of game, the resulting advice message being then displayed on the display 40.

The advice data computing section 22 of the embodiment comprises an advice data storage section 29 in which various advice data prepared for different status of game have previously been stored, and a state judging section 23 for reading out advice data from the advice data storage section 29 when the state of game produced by the game space computing section 30 is coincide with at least one preset advice condition. The read advice data is displayed in a window on the display 40 for a given time through the image synthesizing section 35. At this time, the game space computing section 30 temporarily stops the proceeding of the game when the advice message is being displayed on the display 40 for a given time.

In the present embodiment, the advice data stored in the advice data storage section 29 have been classified into three types, that is, advice data relating to the techniques, advice data relating to the operational manners and advice data relating to the gauges.

The state judging section 23 includes a game state judging section 24, an operational state judging section 26 and a gauge data judging section 28.

When it is judged that the state of game produced by the game space computing section 30 corresponds to the prepared conditions, these judging sections 24, 26 and 28 function to read out the corresponding advice data from the advice data storage section 29, the read advice data being then displayed in the window on the display 40.

A part of the advice data relating to the operational manners has particularly been stored in the advice data storage section 29 as program data for displaying dynamic images. After the corresponding advice data for the state of operation has been read out from the advice data storage section 29, the operational state judging section 26 displays the advice message on the display 40 with dynamic images showing the operational manners for a given time. This can cause the player to visually understand the necessary operational process in an instant.

The advice data may be output from the speaker 52 through the sound synthesizing section 50 as sounds, if required.

The structure and process of the present invention will now be described in detail particularly in connection with the advice display.

In the present embodiment, the player can use the advice deciding means to decide whether or not the advice message is required.

Figure 6:
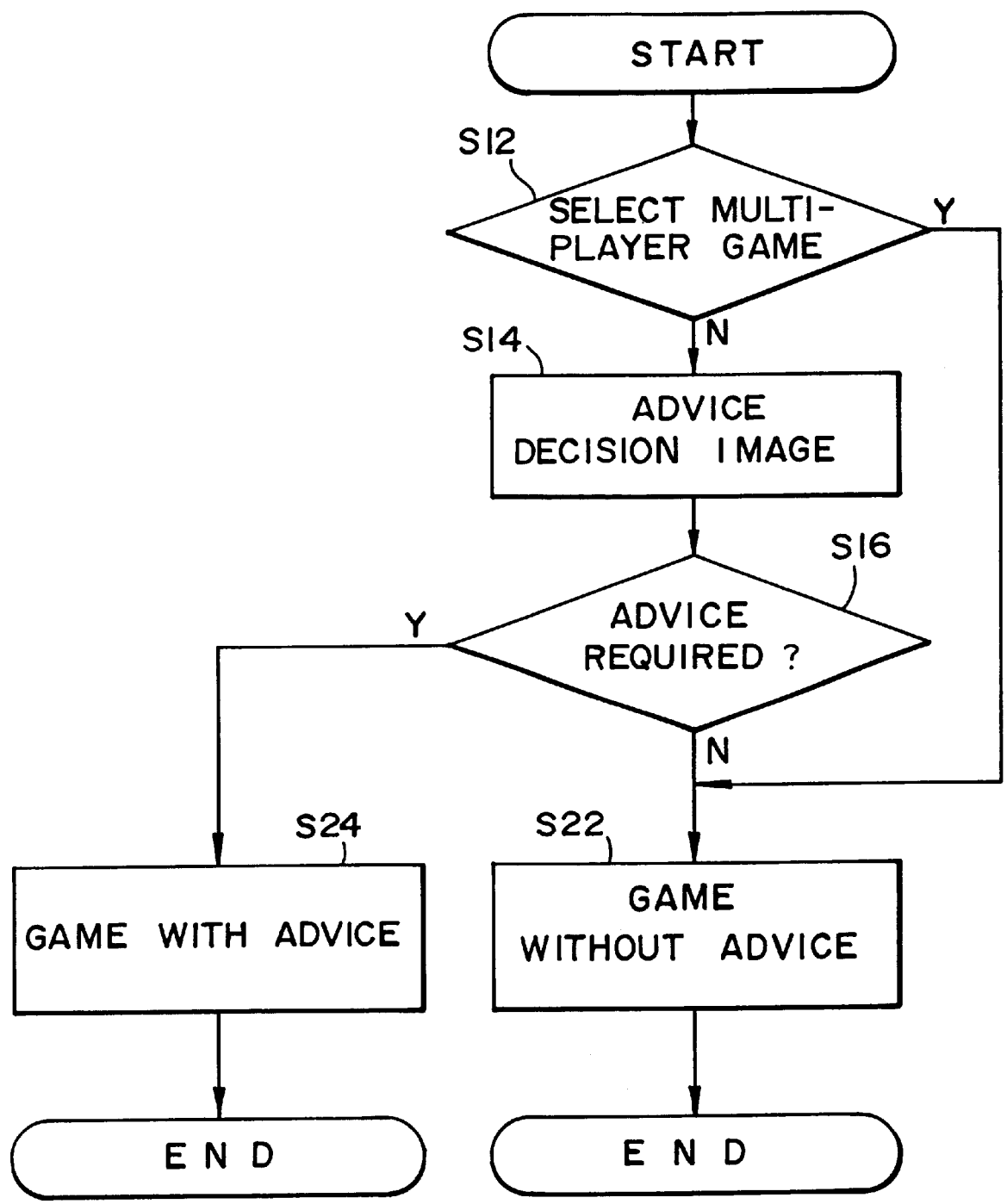
FIG. 6 is a flow chart illustrating a process of deciding advice display in the game apparatus of the embodiment.

FIG. 6 is a flow chart illustrating the process of the advice display. First of all, the player throws a coin into the game apparatus to start the game. If the other player also throws a coin in the game apparatus within a given time, the game apparatus considers that a multi-player game is selected (step 12). Thus, the advice non-display mode is automatically set to start the game without advice display(step 22).

In the present embodiment, this is because a player selecting the multi-player game is believed to be a high-lank player not requiring any advice. However, it is possible to play the multi-player game in the advice display mode. Since the present embodiment is adapted to temporarily stop the game when the advice message is being displayed, however, it is preferred to change the game conditions to display the advice message without interruption of the game.

If the other player do not throw a coin in the game apparatus within the given time, the game apparatus considers that the single-player game is selected by the player. Thus, a message for deciding advice display is shown on the display for a given time (step 14). In this time, the player actuates the trigger 18 to determine whether or not the advice display is needed (step 16). If the player decides the advice display, the game apparatus is set at the advice display mode to start the game with advice (step 24). If advice is not required, the game apparatus is set at the advice non-display mode to start the game without advice (step 22).

The advice display image and the procedure for displaying the advice image will be described.

Figure 8:
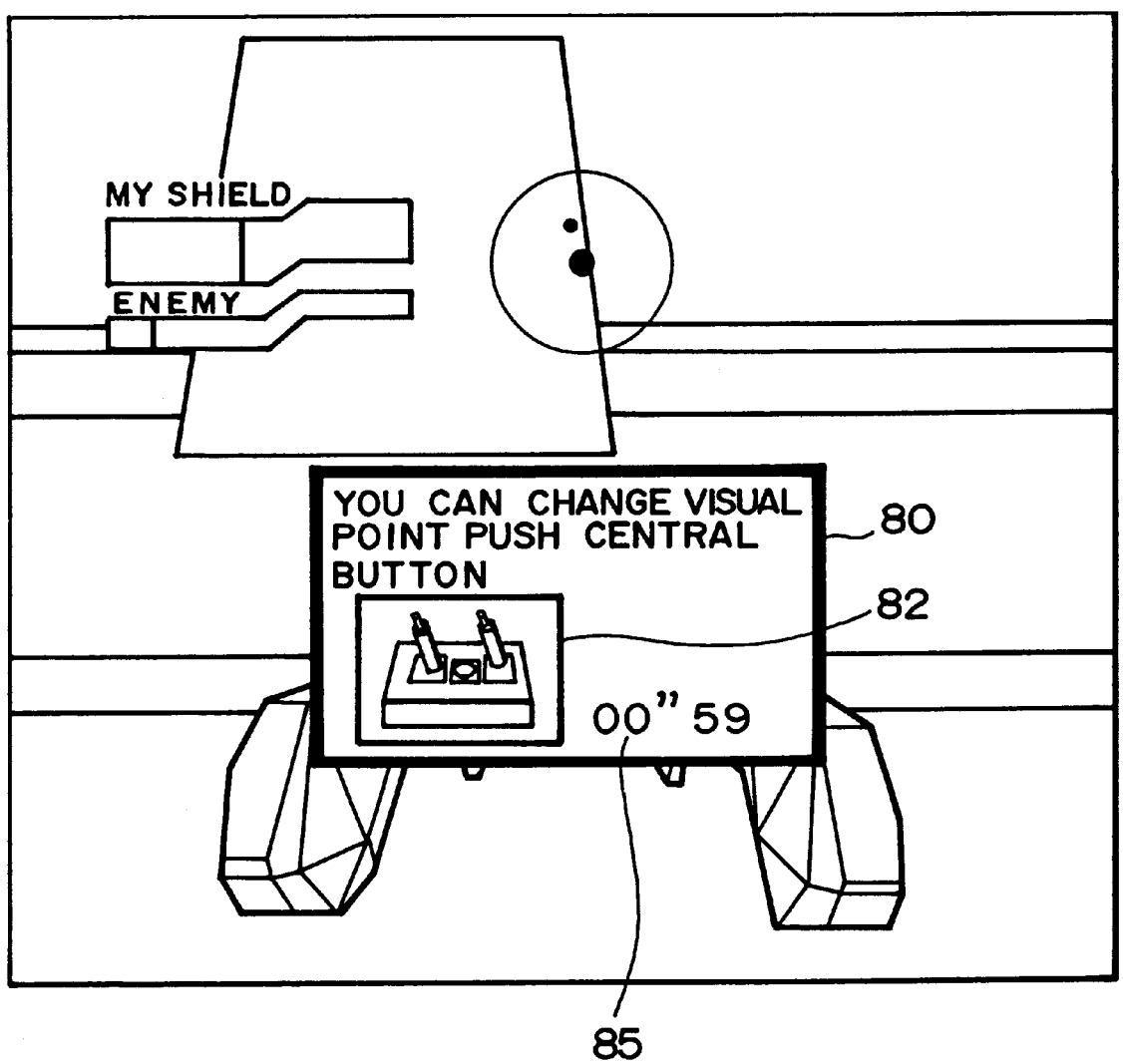
FIG. 8 is a schematic view illustrating a game image that is displayed in a display.

FIG. 8 schematically shows a game image including an advice display on the display. This advice image relates to an operational manner. This advice image includes a message window 80 and a small window 82 located in the message window for displaying the operational manner as a dynamic image. An operational manner which cannot sufficiently be understood through words can be understood in a moment by the player by this small window 82. Timer 85 displayed in the window 80 at the rightward and downward corner represents the remaining time through which the message is being displayed.

The present embodiment provides various advice data relating to the operational manners. Depending on the state of game, the respective advice data can be displayed for a given time (e.g., three to eight seconds). The game will be interrupted during the advice display. If the player judges not to require the advice, the player may actuate the trigger 18 to terminate the windows 80 and 82.

Figure 9:
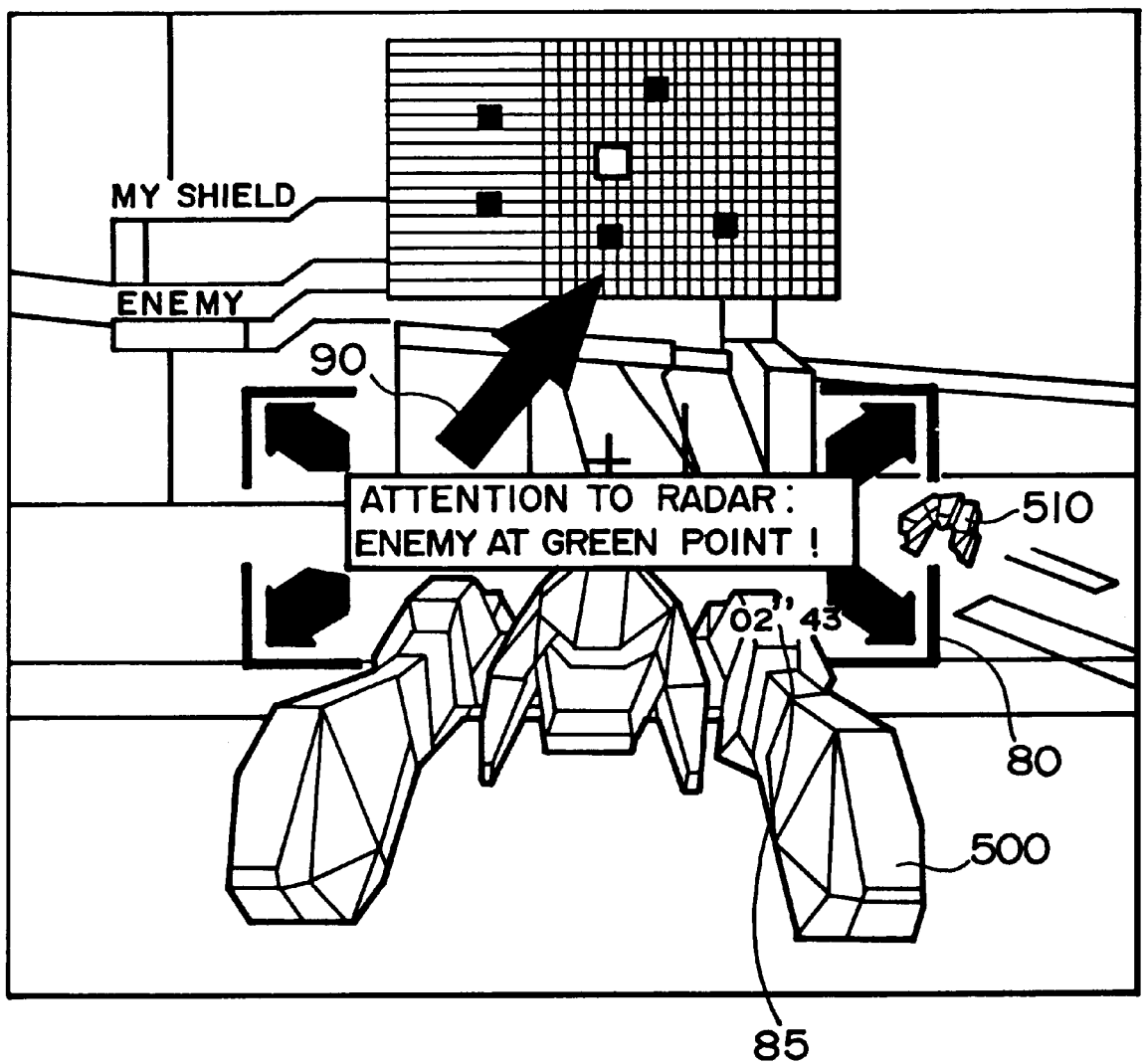
FIG. 9 is a schematic view illustrating another game image that is displayed in a display.

FIG. 9 schematically shows a game image in which an advice image relating to a state of gauge is displayed on the display. Such gauge state advice image includes a message window 80 and an arrow 90 indicating a gauge and others. The message window 80 is transparent not to interfere the game image. Since the relevant gauge is indicated by the arrow 90 formed by polygons, the gauge can be known in a moment. Thus, the player can immediately understand the complicated state which would be hard to understand only by an operating manual. Such display manner is very effective to teach the state of gauge to the player for a brief time during playing.

Timer 85 displayed in the message window at the rightward and downward corner thereof indicates the remaining time through which an advice image is indicated. In the present embodiment, the game is stopped during advice display. If the player judges not to require the displayed advice, the player actuates the trigger 18 to terminate the advice display.

Figure 10:
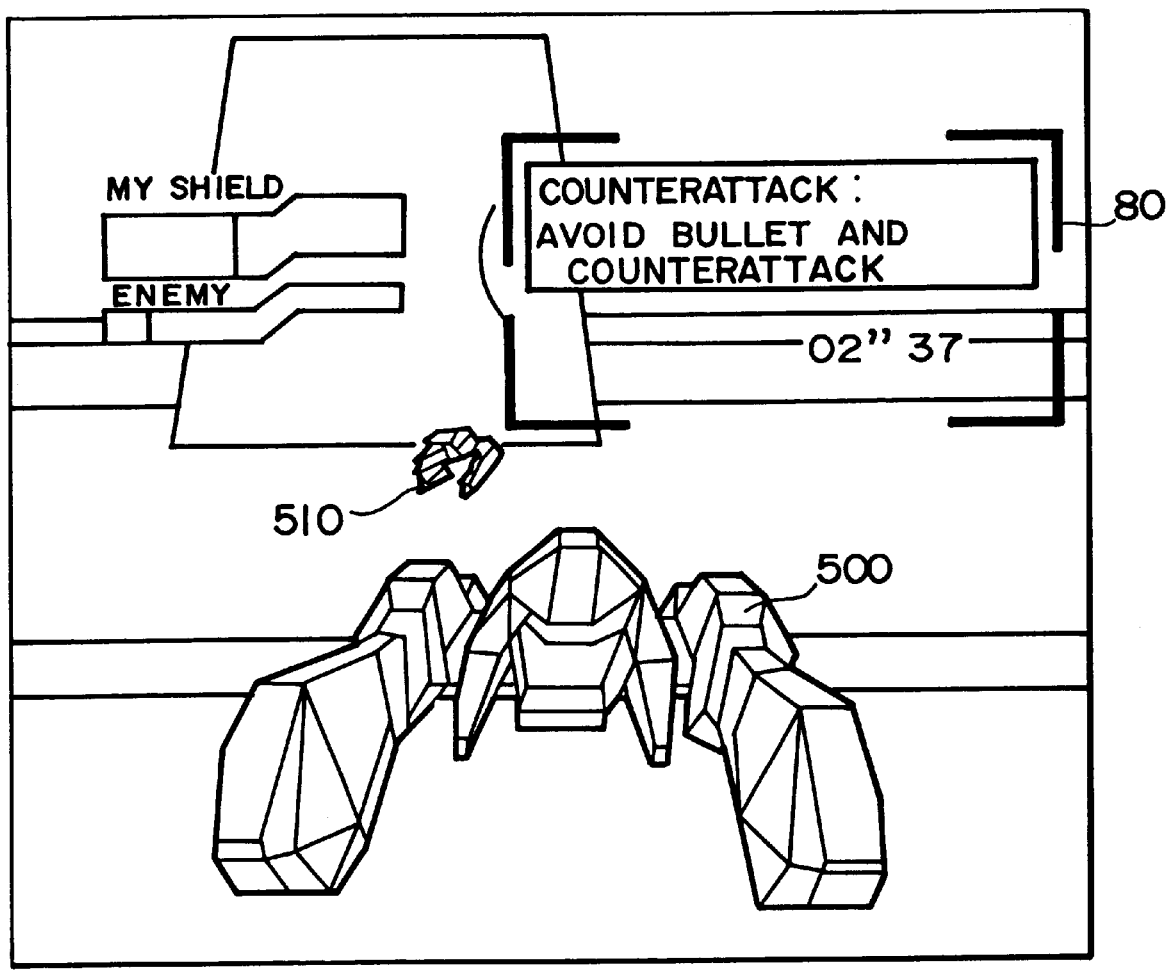
FIG. 10 is a schematic view illustrating still another game image that is displayed in a display.

FIG. 10 schematically shows a game image in which an advice image relating to the state of game is displayed on the display. Such an advice image is displayed in a transparent window 80 without interference with the game image. Since the explanation of attacking/defending techniques is executed during playing if required, the player can understand in a moment the attacking/defending techniques which would be hard to understand only by an operating manual.

The process of displaying an advice image by the advice computing section 22 will be described.

Figure 7:
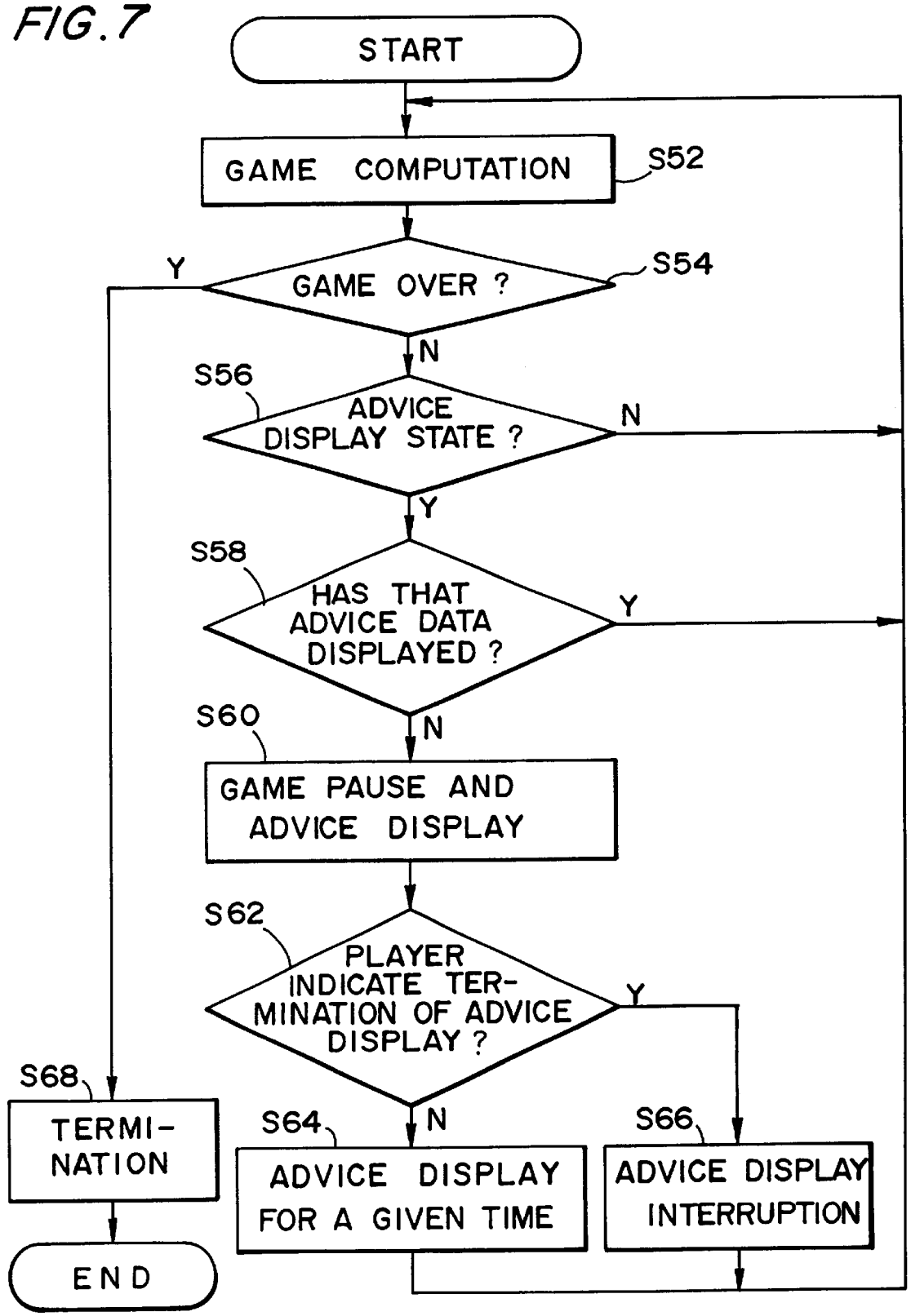
FIG. 7 is a flow chart illustrating a process of outputting the advice data and terminating the advice display in the game apparatus of the embodiment.

FIG. 7 is a flow chart illustrating the process of displaying an advice image. In this example, the advice images having the same contents will not repeatedly be displayed.

As the game with advice message is started, computation is executed depending on the player's input and enemy's attack (step 52). This process is performed in a cycle equal to 1/60 seconds. The game over is judged (step 54). With the game-over, a termination (step 68) is executed.

If there is no game-over, the state judging section 23 judges whether or not an advice message is to be displayed (step 56). Such a judgment is performed by the game state judging section 24, operational state judging section 26 and gauge judging section 28, as will be described later. If there is no state of advice message display, the program returns to its initial step 52. If there is a state of advice message display, the state judging section 23 discriminates whether or not that advice message has previously been displayed (step 58).

If the same advice message has previously been displayed, the program returns to its initial step 52. This can prevent the same advice message from being repeatedly displayed and the advice message display from interfering the game.

If the same advice message has not been displayed, the game is placed in its pause state to display the advice message for a given time (step 60). If the player actuates the trigger 18 within such a given time to indicate the termination of the advice message display (step 62), the advice message display is interrupted (step 66) and the program returns to its initial step 52. If the termination of the advice message display is not terminated, the program will return to its initial step 52 after the advice message has been displayed for a given time (step 64). Thus, the advice message not required by the player can be minimized.

Although the present embodiment has been described as to the advice message initially displayed to minimize the time interrupting the game, a plurality of advice messages may be displayed since they may be required depending on the type of advice message.

Although the present embodiment has been described as to the game paused during display of the advice message, the advice message may be displayed during proceeding of the game depending on the type of game.

The process of displaying the advice message through the judging sections 24, 26 and 28 will be described in detail.

In other words, the process of displaying three patterns of message relating to the information of attacking/defending manner, operational manner and gauges will be described in detail.

Figure 11:
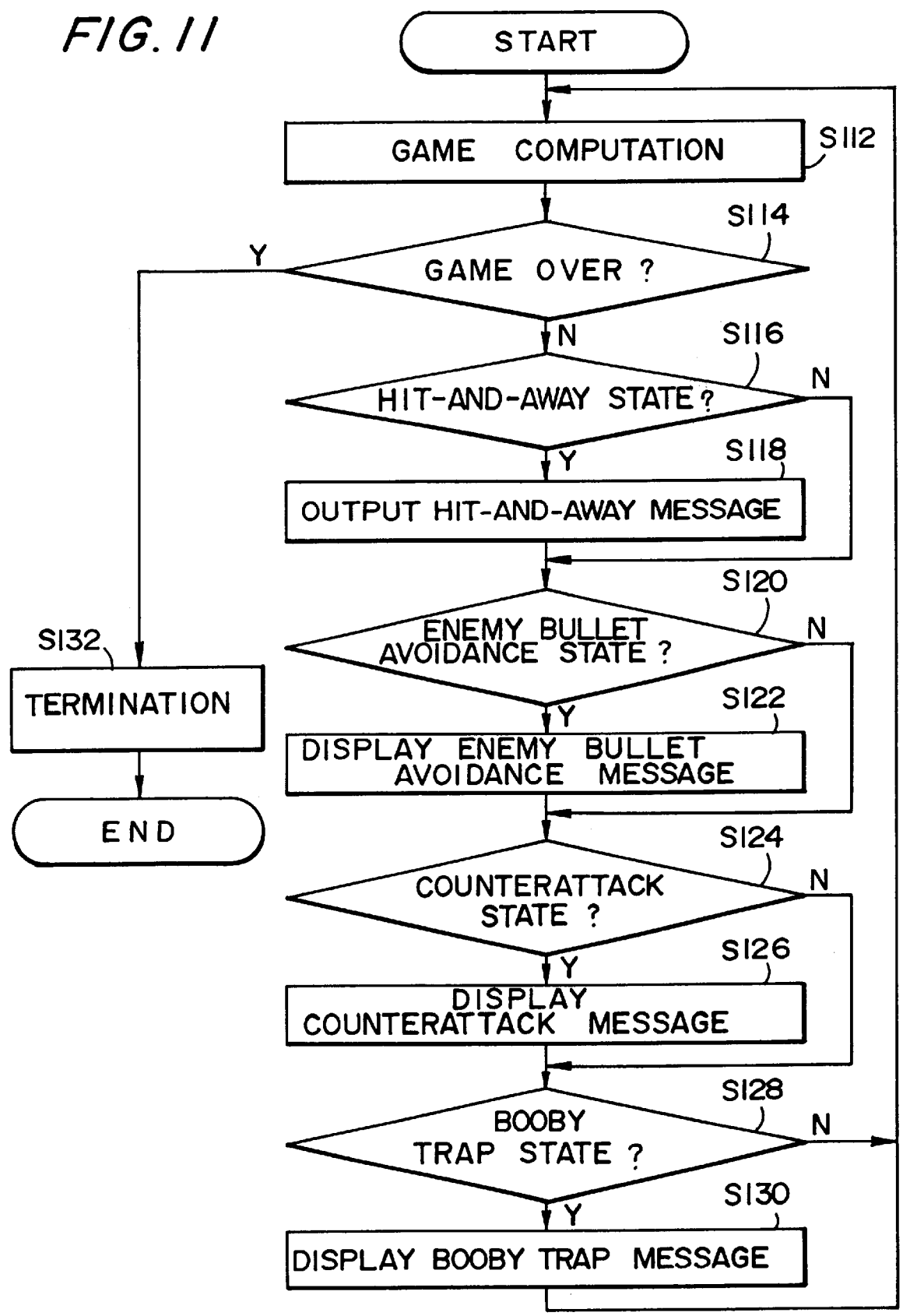
FIG. 11 is a flow chart illustrating the operations of game computing and game state judging sections in the game apparatus of the embodiment.

FIG. 11 shows the process of displaying an advice message from the game state judging section 24. In the video game apparatus of the present embodiment, the player can make good use of the topographies in the game field and utilize various types of techniques to enjoy the game in a realistic manner. Thus, the game state judging section 24 displays the advice message under judgment of the positional and topographic information relating to the player's and enemy's future tanks 500 and 510. As the game is started, the game computation is executed depending on the variations of state including the player's input and enemy's attack (step 112). It is then judged whether or not the game is over (step 114). If the game is over, the termination is performed (step 132). If not so, it is judged whether or not the advice message display is required in the following manner:

First of all, the game state judging section 24 judges whether or not the player's futuristic tank 500 is in a state of hit and away, based on the positional and topographic information relating to the player's and enemy's tanks 500, 510 (step 116). This may means that the enemy's futuristic tank is a building immediately in the front of the player's futuristic tank and behind which the enemy's future tank is located. Under such a situation, for example, an advice message informing "hide behind the building; don't appear before the enemy's futuristic tank" (step 118). The program then proceeds to the next step. If the player's futuristic tank is in such a situation, no advice message will not be displayed. The program proceeds to the next step directly.

The game state judging section 24 then judges whether or not the player's futuristic tank is in a state wherein it should avoid the enemy's bullets, based on the positional and topographic information of the player's and enemy's futuristic tanks 500, 510 (step 120). This may be a state wherein the player's futuristic tank 500 should escape without fighting back immediately when it enters the enemy's range. If the player's futuristic tank is in such a situation, an advice message, "dodge and urgently move abeam" is displayed (step 122) and the program proceeds to the next step. If the player's futuristic tank is not in such a situation, the program proceeds to the next step without displaying of the advice message.

The game state judging section 24 then judges whether or not there is a counter-attack, based on the positional and topographic information relating to the player's and enemy's futuristic tanks 500, 510 (step 124). This is a case wherein the player's futuristic tank cannot immediately fight back although it enters the enemy's range. If the player's futuristic tank is in such a situation, an advice message, "do a counter-attack while avoiding the enemy's bullets" is displayed (step 126) and the program then proceeds to the next step. If the player's futuristic tank is not in such a situation, the program will proceed to the next step.

Next, the game state judging section 24 judges whether or not there is a booby trap, based on the positional and topographic information of the player's and enemy's futuristic tanks 500, 510 (step 128). This is a case where the enemy does not find the player's futuristic tank. If the player's futuristic tank is in such a situation, an advice message, "Booby trap; set a trap and lie in wait" is displayed (step 130) and the program proceeds to the next step. If the player's futuristic tank is not in such a situation, the program will return to its initial step 112 without displaying of the advice message.

Figure 12:
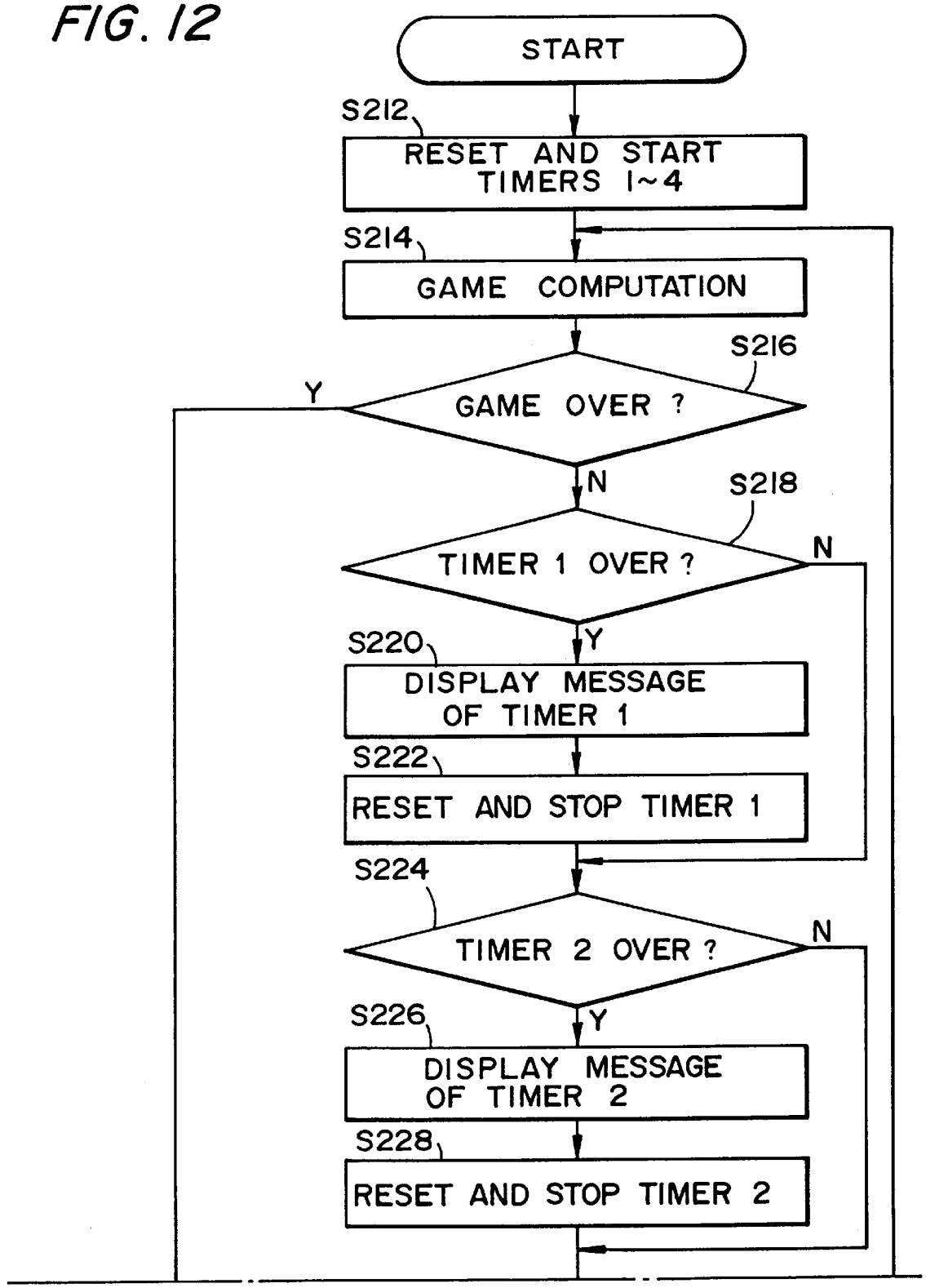
FIG. 12 is a flow chart illustrating the operations of game computing and operation state judging sections in the game apparatus of the embodiment.

FIG. 12 shows the process of advice message display from the operational state judging section 26. The operational state judging section 26 holds the operational history of the player through timers 1 to 4 and judges whether or not the player sufficiently handle the operating means. In the present embodiment, more particularly, the timer 1 takes the history, of turning. In other words, the timer 1 is adapted to be reset when the player actuates the two levers in the opposite directions to turn his or her futuristic tank. If such a reset is not performed over a given time, the game apparatus considers that the player does not master the turning. Thus, an advice message informing it will be displayed.

Similarly, the timer 2 takes the history relating to whether or not the player has attacked through the triggers. The timer 3 takes the history relating to whether or not the player has depressed to change his or her viewpoint. The timer 4 takes the history relating to whether or not the player has actuated the two levers in the same direction to move his or her futuristic tank in all the directions. Each of the timers will be reset when the player executes the corresponding action. If any timer is not reset over a given time, the game apparatus considers that the player does not master that action. It will be represented by an advice message displayed from the game apparatus. The term "a given time" defines a previously optimized time for the system relating to each of the actions. In the present embodiment, each optimized time is set to be between 15 seconds and one minute.

Since the advice message is only initially displayed in the present embodiment, the timers 1 to 4 are so set that they will be stopped when reset after the first advice message has been displayed.

The process of such a process will be described in connection with the flow chart shown in FIG. 12.

The game is started after all the timers 1 to 4 have been reset (step 212).

A computation is then executed depending on the variable state including the player's input and enemy's attack (step 214). It is then judged whether or not the game is over (step 216). If the game is over, the termination of the game is performed (step 242). If the game is not over, it is discriminated whether or not each of the timers exceeds its given time.

The timer 1 is reset when the player actuates two operating levers in the opposite directions to turn his or her futuristic tank. If such a turning operation is not fully executed by the player for a given time, the timer 1 will exceed the given time. At this time, the system of the present invention judges that the player does not master the turning action. If it is detected that the timer 1 exceeds the given time (step 218), a timer-1 advice message, "move two levers in the opposite directions!" is displayed (step 220). Thus, the timer 1 will be reset and stopped (step 222). If it is not detected that the timer 1 exceeds the given time, no advice message will be displayed. Further, the timer 1 will not be reset and the program will proceed to the next step.

The timer 2 is reset when the player executes the trigger attack operation. If the trigger attack operation is not performed by the player for a given time, the timer 2 will exceed the given time. At this time, the system of the present embodiment considers that the player does not master the turning operation. If it is detected that the timer 2 exceeds the given time (step 224), a timer-2 advice message, "use two types of arms" will be displayed (step 226) and the timer 2 will be reset and stopped (step 228). If it is not detected that the timer 2 exceeds the given time, no advice message will be displayed and the timer will not be reset. The program then proceeds to the next step.

The timer 3 is reset when the player depresses the central button to change his or her viewpoint. If the player's viewpoint is not changed for a given time, the timer 3 will exceed the given time. At this time, the system of the present embodiment judges that the player does not master the viewpoint changing operation. If it is detected that the timer 3 exceed the given time (step 230), therefore, a timer-3 advice message, "depress the central button" will be displayed (step 232) and the timer 3 will be reset and stopped (step 234). If it is not detected that the timer 3 exceeds the given time, no advice message will be displayed and the timer 3 will not be reset. The program then proceeds to the next step.

The timer 4 is reset when the player actuates two levers in the same direction to move his or her futuristic tank in all the directions. If the player did not make such a movement for a given time, the timer 4 will exceed the given time. The system of the present embodiment judges that the player does not master the movement in all the directions. If it is detected that the timer 4 exceeds the given time (step 236), a timer-4 advice message, "move two levers in the same direction" will be displayed (step 238) and the timer 4 will be reset and stopped (step 240). If it is not detected that the timer 4 exceeds the given time, no advice message will be displayed and the timer will not be reset. The program then returns to the step 214.

Figure 13:
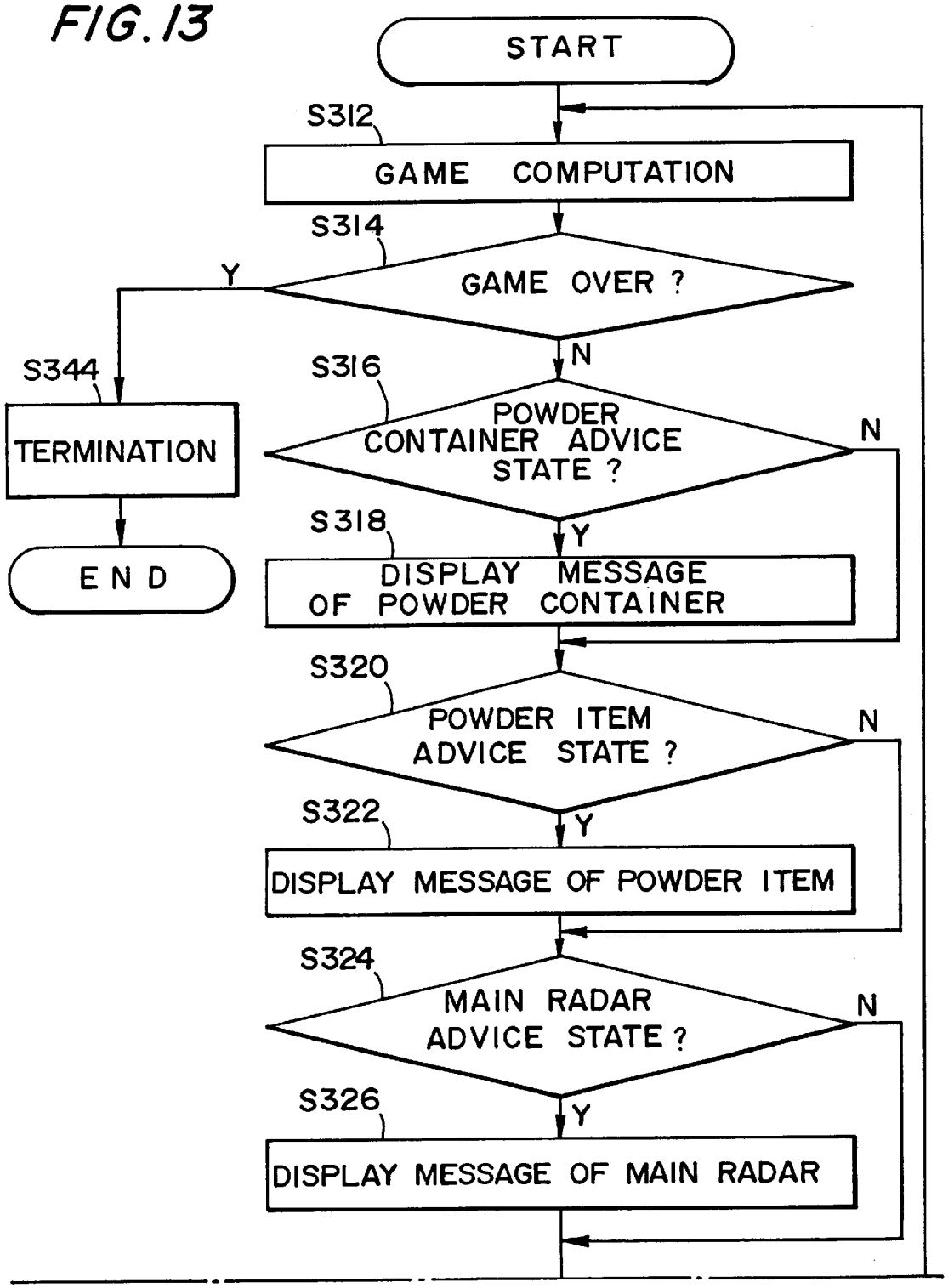
FIG. 13 is a flow chart illustrating the operations of game computing and gauge state judging sections in the game apparatus of the embodiment.

FIG. 13 shows the process of advice message display from the gauge judging section 28. The gauge judging section 28 monitors the gauges including main radar, compass radar, shield gauge and so on, the number of player's remaining bullets, the bullet container, the bullet item, the remaining time and so on. When the player should be informed with one of these factors, an advice message will be displayed.

The process will be described in detail with reference to the flow chart shown in FIG. 13.

As the game is started, the game is computed depending on variations of the state including the player's input and enemy's attack (step 312).

The game apparatus then judges whether or not the game is over (step 314). If the game is over, the termination of the game is performed (step 344). If the game is not over, it is judged whether or not the state of gauges or others should be informed to the player in the following manner.

When the bullet container appears on the game image (step 316), an advice message, "Bullet container; dash and supplement bullets" will be displayed since the player can supplement bullets (step 318). If the above situation does not exist, no advice message will be displayed and the program will proceed to the next step.

If the bullet item appears on the game image (step 320), an advice message, "shoot the item: the supplement increases two times if the item is broken" will be displayed since if the item is broken by the player, the supplement is increased two times (step 322). If such a situation does not exist, the program will proceed to the next step without display of the advice message.

If the enemy appears on the main radar (step 324), an advice message, "Watch the radar: a green spot indicates the position of the enemy" will be displayed (step 326). If such a situation does not exist, the program will proceed to the next step without any advice message.

If the enemy appears on the compass radar (step 324), an advice message, "Watch the compass: there is an enemy in the direction of arrow" will be displayed (step 330). If such a situation does not exist, the program will proceed to the next step without any advice message.

If the player's bullets decreases to minimum (step 332), an advice message, "Beware of bullets: supplement bullets through items" will be displayed (step 334). If such a situation does not exist, the program will proceed to the next step without any advice message.

If the shield gauge becomes insufficient (step 336), an advice message, "Beware of the damage: explosion when the gauge becomes zero" will be displayed (step 338). If such a situation does not exist, the program will proceed to the next step without display of any advice message.

If the remaining time decreases (step 340), an advice message, "Colony is falling: beware of the remaining strategy time" will be displayed (step 342). If such a situation does not exist, the program will return to the step 312 without display of any advice message.

The present invention is not limited to the aforementioned embodiments, but may be embodied in any one of various modified and changed forms.

Although the embodiments have been described as to the three-dimensional game in which the futuristic tank controlled by the player fights the other futuristic tank controlled by the computer within the virtual three-dimensional game space, the present invention is not limited to such a three-dimensional game, but may be applied to any of various types of video game systems. Although the embodiments have been described as to the display of advice images, the present invention may be applied to a combination of images with sounds or only to advice sounds.

The present invention may be applied not only to the game machines in business use, but also to any game apparatus in home use. Furthermore, the present invention may be applied to a large-sized attraction type game apparatus in which a number of players join with the game.

The computation executed by the game space computing section 30, image synthesizing section 35 and so on may be executed by the use of an exclusive image processing device or in a software manner through a general purpose microcomputer, DSP or the like.

In the multi-player type game system shown in FIG. 2, the player permits any other player to break into the game when a single-player type game is being played by the player. The game apparatus may be adapted to set a breaking-into acceptable mode in which the game being played can be shifted to a game with the other player. At this time, the player selected the breaking-into acceptable mode is believed to be a skilled player. It is thus preferred that if such a mode is selected, the game apparatus is automatically set at the advice non-display mode.

The present invention may use a head-mount display (HMD).

What is claimed is:

1. A video game apparatus comprising:
 a display;
 game operating means operated by a player;
 game computing means for computing a game in accordance with an operation signal from said game operating means and a predetermined game program to display a game image on said display; and advice data computing means which computes and outputs advice data for the player depending on a state of the game, wherein said advice data computing means comprises an operational state judging section for judging an operational state of the game operating means from an operational history of the player, the advice data computing means automatically generating an operation advice image of the game operating means, and displays the operation advice image on the display depending on the operational state.

2. The video game apparatus according to claim 1, wherein said advice data computing means computes advice data depending on a state of the game to display an advice image.

3. The video game apparatus according to claim 2, wherein:
   said game operating means comprises:
      steering means for steering a player's object which moves in a game space, and
      attacking means actuatable by the player for attacking an enemy or target;
   said game computing means comprises:
      three-dimensional space computing means for computing a three-dimensional game space in which the player's object moves and attacks said enemy or target in accordance with an operational signal from said game computing means and a predetermined game program, and
      three-dimensional image synthesizing means for synthesizing a pseudo three-dimensional image which is obtained when said three-dimensional game space is viewed from a given viewpoint to display said pseudo three-dimensional image on the display as a game image; and
   said advice data computing means comprises:
      data storage means for storing advice data which advises the player how to operate at least one of said steering means and said attacking means as dynamic image data in different states of the game as advice data, and
      state judging means for judging a state of the game, wherein said advice game computing means reads out said advice data appropriate to the state of the game from said data storage means and displays the advice data as a dynamic image.

4. The video game apparatus according to claim 2, further comprising sound generating means for producing sounds for the game, wherein said advice data computing means computes advice data depending on a state of the game to generate advice sounds through said sound generating means.

5. The video game apparatus according to claim 2, wherein said advice data computing means comprises data storage means which stores advice data for operating said game operating means as dynamic image data, and said advice data computing means reads out the advice data appropriate to the operational state and displays operation of the game operating means as a dynamic image.

6. The video game apparatus according to claim 5, wherein said game computing means displays said advice data computed by said advice data computing means in a window in a game image.

7. The video game apparatus according to claim 2, wherein said game computing means displays said advice data computed by said advice data computing means in a window in a game image.

8. The video game apparatus according to claim 1, wherein said advice data computing means comprises a game state judging section for judging a state of the game, said advice data computing means automatically generating an advice image which advises the player how to proceed with the game depending on the judging data.

9. The video game apparatus according to claim 8, wherein said advice data computing means comprises a gauge data judging section for judging data of gauges used in the game to select advice data appropriate to gauge data.

10. The video game apparatus according to claim 1, further comprising sound generating means for producing sounds for the game, wherein said advice data computing means computes advice data depending on a state of the game to generate advice sounds through said sound generating means.

11. The video game apparatus according to claim 1, wherein said advice data computing means comprises a gauge data judging section for judging data of gauges used in the game to select advice data appropriate to gauge data.

12. The video apparatus according to claim 1, wherein said advice data computing means comprises a gauge data judging section for judging data of gauges used in the game, the advice data computing means automatically generating an advice image which advises the player on a current state of a gauge and displays the advice image on the display depending on the judging data.

13. The video game apparatus according to claim 1, wherein said game operating means comprises advice deciding means for the player to decide whether advice display is required or not.

14. The video game apparatus according to claim 1, wherein said game computing means proceeds with the game without interruption when an advice image is being displayed.

15. The video game apparatus according to claim 1,
   wherein said game operating means comprises advice terminating means; and
   wherein said game computing means stops the game when an advice image is being displayed, and restarts the game when said advice terminating means is operated during advice display.

16. The video game apparatus according to claim 1, wherein said advice data computing means limits displaying of identical advice images to a given number of times.

17. The video game apparatus according to claim 1, wherein:
   said game operating means comprises:
      steering means for steering a player's object which moves in a game space,
      attacking means actuatable by the player for attacking an enemy or target;
   said game computing means comprises:
      three-dimensional space computing means for computing a three-dimensional game space in which the player's object moves and attacks said enemy or target in accordance with an operational signal from said game computing means and a predetermined game program, and
      three-dimensional image synthesizing means for synthesizing a pseudo three-dimensional image which is obtained when said three-dimensional game space is viewed from a given viewpoint to display said pseudo three-dimensional image on the display as a game image; and
   said advice data computing means comprises:
      data storage means for storing advice data which advises the player how to operate at least one of said steering means and said attacking means as dynamic image data, and state judging means for judging a state of the game, wherein said advice game computing means reads out said advice data appropriate to the state of the game from said data storage means and displays the advice data as a dynamic image.

18. A method of synthesizing an image for a video game apparatus, comprising:

judging an operational state of name operating means from an operational history of a player;

automatically computing an operational advice image of the game operating means depending on the judging operational state; and displaying the operation advice image on the display.

19. A video game apparatus comprising:

a display;

game operating means operated by a player;

game computing means for computing a game in accordance with an operation signal from said game operating means and a predetermined game program to display a game image on said display; and advice data computing means which computes and outputs advice data for the player depending on a state of the game, wherein said advice data computing means comprises a gauge data judging section for judging data of gauges used in the game, the advice data computing means automatically generating an advice image which advises the player on a current state of a gauge and displays the advice image on the display depending on the judging data.

20. A video game apparatus comprising:

a display;

game operating means operated by a player;

game computing means for computing a game in accordance with an operation signal from said game operating means and a predetermined game program to display a game image on said display; and advice data computing means which automatically computes and outputs advice data for the player depending on a state of the game, wherein said advice data computing means limits displaying of identical advice images to a given number of times.

* * * * *